(12) United States Patent
Moore

(10) Patent No.: US 9,728,949 B2
(45) Date of Patent: Aug. 8, 2017

(54) APPARATUS AND METHOD FOR PREVENTING INTRUSION INTO SPLICE CLOSURE

(71) Applicant: Richard A. Moore, Granite Falls, NC (US)

(72) Inventor: Richard A. Moore, Granite Falls, NC (US)

( * ) Notice: Subject to any disclaimer, the term of this patent is extended or adjusted under 35 U.S.C. 154(b) by 83 days.

(21) Appl. No.: 14/507,570

(22) Filed: Oct. 6, 2014

(65) Prior Publication Data
US 2016/0099558 A1 Apr. 7, 2016

(51) Int. Cl.
*H02G 15/113* (2006.01)
*H02G 15/013* (2006.01)

(52) U.S. Cl.
CPC ......... *H02G 15/113* (2013.01); *H02G 15/013* (2013.01)

(58) Field of Classification Search
CPC ................................... H02G 15/113
USPC ......................... 172/92; 174/70 R
See application file for complete search history.

(56) References Cited

U.S. PATENT DOCUMENTS

| 3,692,926 | A | * | 9/1972 | Smith ................. | D07B 7/169 |
| | | | | | 174/77 R |
| 3,846,578 | A | * | 11/1974 | Bahder ................ | H02G 15/18 |
| | | | | | 174/73.1 |
| 4,282,397 | A | * | 8/1981 | Siedenburg ........... | B29C 61/10 |
| | | | | | 174/92 |
| 4,426,413 | A | * | 1/1984 | Fentress ............... | H02G 15/18 |
| | | | | | 156/49 |
| 4,492,816 | A | * | 1/1985 | Morel .................. | H02G 15/013 |
| | | | | | 174/77 R |
| 4,538,021 | A | * | 8/1985 | Williamson, Jr. ..... | H02G 15/013 |
| | | | | | 174/92 |
| 4,639,546 | A | * | 1/1987 | Meltsch ............... | H02G 15/1806 |
| | | | | | 156/49 |

(Continued)

OTHER PUBLICATIONS

3M Communication Markets Division, 3M SLiC Aerial Closures and Terminals—Reliable Protection and Easy Access, 2012, 16 pgs., Austin, TX USA.

(Continued)

*Primary Examiner* — Timothy Thompson
*Assistant Examiner* — Krystal Robinson
(74) *Attorney, Agent, or Firm* — Christopher C. Dremann, P.C.; Christopher C. Dremann

(57) ABSTRACT

An apparatus and method for preventing intrusion into a splice closure includes a pair of end wall plates, a first housing plate and a second housing plate affixed to an outer casing of the splice closure. Each end wall plate includes two or more end wall segments made of a formable metal and having a plurality of finger-shaped extensions that are bendable to conform to the contour of an end wall of the splice closure and around any cable(s) entering or exiting the splice closure. The first housing plate is made of a metal and pre-formed to conform to the contour of a first housing half of the outer casing of the splice closure. The second housing plate is made of a metal and pre-formed to conform to the contour of a second housing half of the outer casing of the splice closure. The first and second housing plates may be separable along a centerline of symmetry for use with an extended-length splice closure.

18 Claims, 10 Drawing Sheets

(56) References Cited

U.S. PATENT DOCUMENTS

| | | | | |
|---|---|---|---|---|
| 4,647,713 | A * | 3/1987 | de Nijs | H02G 15/24 138/162 |
| 4,656,316 | A * | 4/1987 | Meltsch | H02G 15/1806 174/92 |
| 4,666,537 | A * | 5/1987 | Dienes | H02G 15/18 156/48 |
| 4,810,829 | A * | 3/1989 | Rutenbeck | H02G 15/10 174/41 |
| 4,857,672 | A * | 8/1989 | Rebers | G02B 6/4444 174/77 R |
| 5,247,135 | A * | 9/1993 | Rebers | H02G 15/117 174/41 |
| 5,525,756 | A | 6/1996 | Mullaney et al. | |
| 5,567,914 | A | 10/1996 | Minarovic et al. | |
| 7,282,644 | B1 | 10/2007 | Alvey | |
| 8,841,553 | B2 * | 9/2014 | Dower | H02G 15/18 174/92 |
| 2002/0064363 | A1 * | 5/2002 | Grubish | G02B 6/4444 385/135 |
| 2003/0141095 | A1 * | 7/2003 | Roosen | G02B 6/2558 174/84 R |
| 2004/0219820 | A1 * | 11/2004 | Sokol | H01R 4/70 439/369 |
| 2004/0231881 | A1 * | 11/2004 | Muller | H02G 15/007 174/93 |
| 2006/0011372 | A1 * | 1/2006 | Rodrigues | H02G 15/10 174/92 |
| 2006/0204198 | A1 * | 9/2006 | Michiels | G02B 6/4446 385/135 |

OTHER PUBLICATIONS

Norscan, The Norscan Report, Jan. 2009, pp. 1-3, vol. 3, Issue 1, Winnlpeg, MB Canada.

* cited by examiner

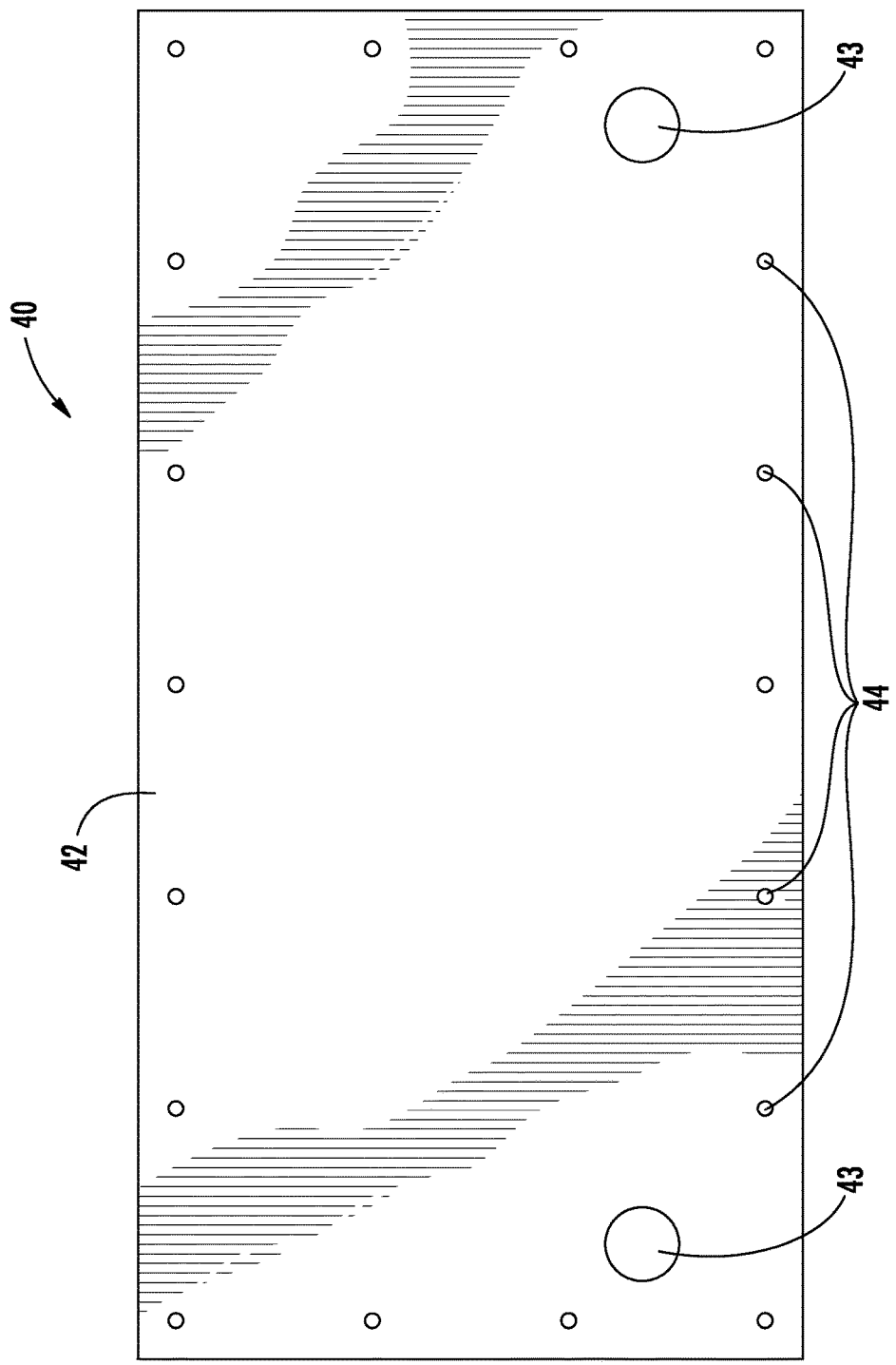

APPARATUS AND METHOD FOR PREVENTING INTRUSION INTO SPLICE CLOSURE

FIELD OF THE INVENTION

The present invention relates generally to splice closures for housing splice connections, commonly referred to as cable splices, between communications cables. More particularly, the invention is an apparatus and method for preventing intrusion into an aerial splice closure. In the illustrative examples provided herein, the invention is embodied by metal plates configured to closely conform to the outer contours of the splice closure, thereby preventing animals, such as rodents (especially squirrels) and birds, from gaining access to the interior of the closure by eating, gnawing or tearing away the relatively soft elastomeric material of the end walls or the relatively hard plastic material of the outer casing.

BACKGROUND OF THE INVENTION AND RELATED ART

Communication cables are typically interconnected by splicing together conductors of the cables. When communications cables are spliced together in an aerial location, a case or enclosure, commonly referred to as a splice closure, is suspended from a carrier cable and installed around the aerial location to protect the cable splices from exposure to the environment and the elements. Most splice closures include an outer casing formed by two housing halves made of a relatively hard plastic material that are hinged together in a clamshell fashion to permit access to the cable splices. When closed, the housing halves are fastened together, for example by latches, along the longitudinal length of the closure. The ends of the splice closure are typically closed with end caps made of a relatively soft elastomeric material, for example rubber, that are configured to conform to the size, shape and location of the cables entering and exiting the closure.

The plastic outer casing formed by the housing halves is generally impervious to the elements, including wind and moisture, and shields the cables splices from exposure to ultraviolet (UV) radiation. Accordingly, the cable splices are well protected unless the structural integrity of the splice closure is compromised. It is well known that aerial splice closures are an attractive habitat for animals, such as rodents (especially squirrels) and birds. In addition, animals mistake the insulated cables, as well as the elastomeric material end caps and the plastic outer casing of the splice closure, for the foodstuffs of their natural environment. As a result, animals routinely eat, gnaw and tear away at the outer casing of the splice closure in an attempt to gain access to the interior. The relatively soft elastomeric material of the end caps is most vulnerable and provides the least amount of resistance for intrusion into the splice closure. However, determined animals are also capable of gaining access to the interior of the splice closure through the relatively hard plastic outer casing. Once the structural integrity of the splice closure is breached, the cables splices within the closure are susceptible to damage from the animal infestation, and in addition, due to corrosion as a result of exposure to the elements. Eventually, one or more of the cable splices is compromised sufficiently to interrupt communications service and must be reworked.

The problem of animal intrusion into splice closures is well documented in the January 2009, Volume 3, Issue 1, edition of The Norscan Report at pages 2-3. The Norscan Report suggests that potential solutions to rodent infestation into aerial splice closures include 1) using armored cable; 2) avoiding known natural environments of rodents; and 3) managing the growth of flora in the vicinity of the closure. The report also teaches that a retro-fit rodent deterrent can also be implemented on existing cable infrastructures by energizing any armored cable with a direct current (DC) or an alternating current (AC) voltage. Utilizing armored cable, energized or otherwise, is oftentimes impractical. Avoiding the known natural environments of rodents and is sometimes impossible and managing the growth of flora is only temporary. Accordingly, after reconfiguring the cables splices, the damage to the splice closure is typically repaired by a suitable means or the splice closure is removed and replaced by a new closure. In the event of repeated damage to the same splice closure, the conventional hard plastic and elastomeric material closure is removed and replaced by a metal enclosure. Regardless, reconfiguring the cable splices and repairing or replacing the splice closure more than once is costly and time consuming. More importantly, each instance of rodent intrusion into the splice closure can result in loss of service for an extended period of time with an accompanying loss of revenue.

U.S. Pat. No. 7,282,644 B1 issued Oct. 16, 2007, to Stephen L. Alvey and assigned to Verizon Services Corporation of Arlington, Va., USA, discloses an aerial cable splice closure having rubber end walls at either end of the closure. A protective shield may be affixed to the outside of each of the end walls of the closure to protect the rubber end walls from being breached by an animal intrusion. Each shield is made of a relatively hard plastic material formed in two halves. The halves are provided with semi-circular cutouts so that the shield can be positioned about the centrally located cable entering and exiting the closure. The cutouts can be configured with different radii to accommodate centrally located cables of different diameters. However, as previously mentioned, a determined animal is capable of eating, gnawing or tearing away even the hard plastic protective shields or the outer casing of the remainder of the splice closure. Furthermore, each protective shield can only be configured to closely surround a centrally located cable entering or exiting the closure.

Accordingly, there exists a need for an improved apparatus and method for preventing intrusion into an aerial splice closure. More specifically, there exists a need for an apparatus and method for preventing animals, such as rodents (especially squirrels) and birds, from gaining access to the interior of a splice closure by eating, gnawing or tearing away either the relatively soft elastomeric material end walls of the closure or the relatively hard plastic outer casing of the closure. In addition, there exists a particular need for an apparatus and method for preventing intrusion by an animal into an aerial splice closure having one or more cables entering and/or exiting the closure that are not centrally located relative to the outer casing of the closure.

SUMMARY OF THE INVENTION

The present invention is an apparatus and method for preventing intrusion into an aerial splice closure so as to protect the cable splices within the interior of the closure from damage due to an infestation or exposure to the elements. In an exemplary embodiment, an apparatus according to the invention includes metal plates that are configured to closely conform to the periphery of the outer casing of the splice closure. The metal plates include a pair of end walls plates, a first housing plate and a second housing plate. Each end wall plate includes at least two complementary end wall arcs having a plurality of cutouts defining bendable finger-shaped extensions that can be formed to closely conform to the end wall of the splice closure and to any cable(s) entering or exiting the splice closure. The first housing plate is pre-formed to closely conform to a first housing half of the outer casing of the splice closure, while the second housing plate is pre-formed to closely conform to a second housing half of the outer casing of the splice closure. The end wall plates, the first housing plate and the second housing plate are provided with a plurality of holes formed there through for affixing the metal plates to the outer casing of the splice closure with fasteners, such as for example, self-threading (i.e. self-tapping) screws. The first housing plate and the second housing plate may be provided with cutouts as necessary to permit structural components of the splice closure, such as for example, latches for securing together the first and second housing halves of the outer casing and/or hangers for suspending the splice closure from an aerial carrier wire or cable.

In another exemplary embodiment, a method according to the invention includes the step of providing a splice closure having an outer casing consisting of a first housing half made of a relatively hard plastic material, a second housing half made of a relatively hard plastic material and movably connected to the first housing half, and an end wall made of a relatively soft elastomeric material disposed at each longitudinal end of the outer casing for closing an interior compartment defined by the outer casing. The method includes the further step of providing an apparatus for preventing intrusion into the splice closure consisting of a pair of end wall plates made of a formable metal, a first housing plate made of a metal, and a second housing plate made of a metal. The method includes the further step of affixing each of the end wall plates to the outer casing of the splice closure adjacent an end wall and forming at least a portion of the end wall plate over the end wall of the splice closure. The method includes the further step of affixing the first housing plate to the outer casing of the splice closure over the first housing half. The method includes the further step of affixing the second housing plate to the outer casing of the splice closure over the second housing half.

Other aspects, objects, features and advantages of the present invention will be made apparent or will be readily understood and appreciated by those skilled in the apparel art as the invention is described in greater detail hereinafter and is shown in the accompanying drawing figures. It is envisioned that all such aspects, objects, features and advantages of the invention as shown and described herein will be within the intended broad scope of the appended claims. The above and other aspects, objects, features and advantages may be accomplished by the exemplary embodiment of the invention described herein and illustrated in the accompanying drawings. However, it should be appreciated that the drawing figures are for illustrative purposes only, and that many modifications may be made to the specific construction of the exemplary embodiment illustrated therein without departing from the broadest reasonable interpretation of the appended claims.

BRIEF DESCRIPTION OF THE DRAWINGS

The aforementioned objects, features and attendant advantages of the present invention will be more fully understood and appreciated when considered in conjunction with the accompanying drawings, in which like reference characters designate the same or similar parts throughout the several views.

FIG. 5 is a plan view of a first housing plate according to the invention.

DETAILED DESCRIPTION OF THE EXEMPLARY EMBODIMENTS

Figure 1:
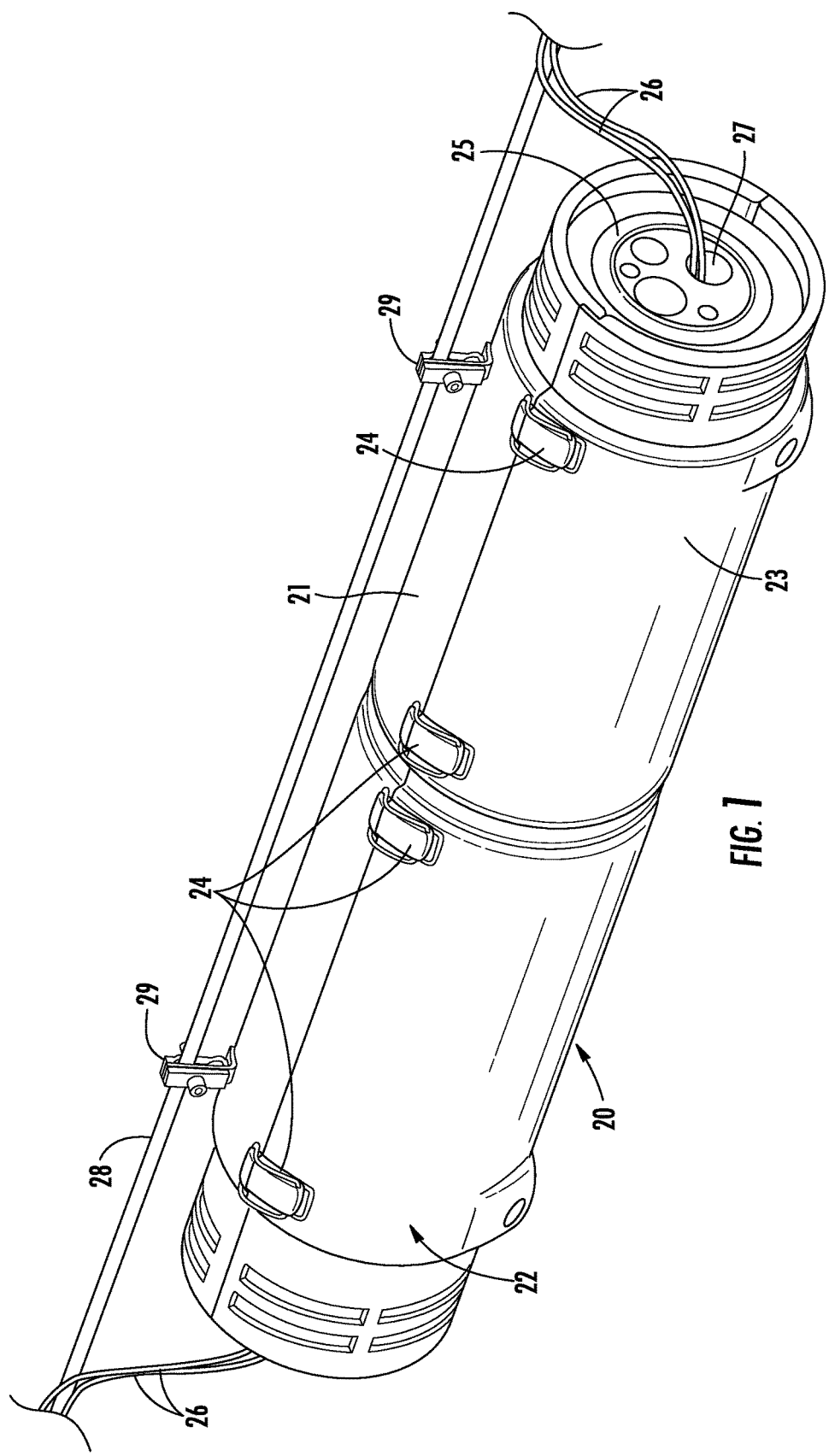
FIG. 1 is an environmental perspective view of a conventional aerial splice closure suspended from a carrier wire or cable.

FIG. 1 shows a conventional aerial splice closure, indicated generally at 20, for use with the present invention. The splice closure 20 comprises an outer casing 22 formed by a first housing half 21 and a second housing half 23 made of a non-metallic material, such as a relatively hard plastic material. The housing halves 21, 23 are hinged together in a clamshell fashion and fastened together by one or more latches 24 along the longitudinal length of the closure. The opposite ends of the outer casing 22 of the splice closure 20 are closed by end walls 25 made of a relatively soft elastomeric material, for example rubber. As a result, outer casing 22 defines a generally hollow interior compartment (not shown) for housing cable splices between conductors of one or more communication cables 26 to protect the cable splices from exposure to the environment and the elements in a known manner. The splice closure 20 is installed around the cable splices at an aerial splice location and the communications cables 26 are routed into and out of the interior compartment defined by the outer casing 22 through openings 27 provided in the end walls 25. As shown herein, the splice closure 20 is suspended from a carrier wire or cable 28 by one or more hangers 29 disposed along the longitudinal length of the first housing half 21. Latches 24 permit access to the cables splices housed within the interior compartment of the splice closure 20 by, for example, an installer or service technician. A splice closure 20 suitable for use with the invention is available from the 3M Communication Markets Division of 3M Company headquartered outside St. Paul, Minn. and commercially known as the SLiC™ Aerial Closure. However, numerous other splice closures constructed of non-metallic outer casings and end walls are equally suitable for use with the invention.

The present invention is an apparatus, indicated herein generally at 30, and a method, indicated herein generally at 50, for preventing animal intrusion into the aerial splice closure 20. It is well known and documented that animals, such as rodents (especially squirrels) and birds, are capable of eating, gnawing or tearing away the relatively soft elastomeric material end walls 25 and/or the relatively hard plastic material outer casing 22 of the splice closure 20 to thereby gain access to the interior compartment of the closure. In some instances, the animal intrusion permits the interior compartment to be exposed to the environment and to the elements, for example moisture that causes damage (e.g. corrosion) to the cable splices. In other instances, animals inhabit the interior compartment of the splice closure and eventually cause damage to the cables splices. Regardless, intrusion into the interior compartment of the splice closure 20 typically results in a loss of communication services that require an installer or service technician to rework the cable splices and to repair or replace the splice closure. The present invention avoids the time consuming and costly need to repeatedly repair or replace the splice closure 20. In particular, the apparatus 30 of the invention comprises metal plates consisting of a pair of end wall plates 32, a first housing plate 40 and a second housing plate 45, as described hereinafter.

Figure 2:
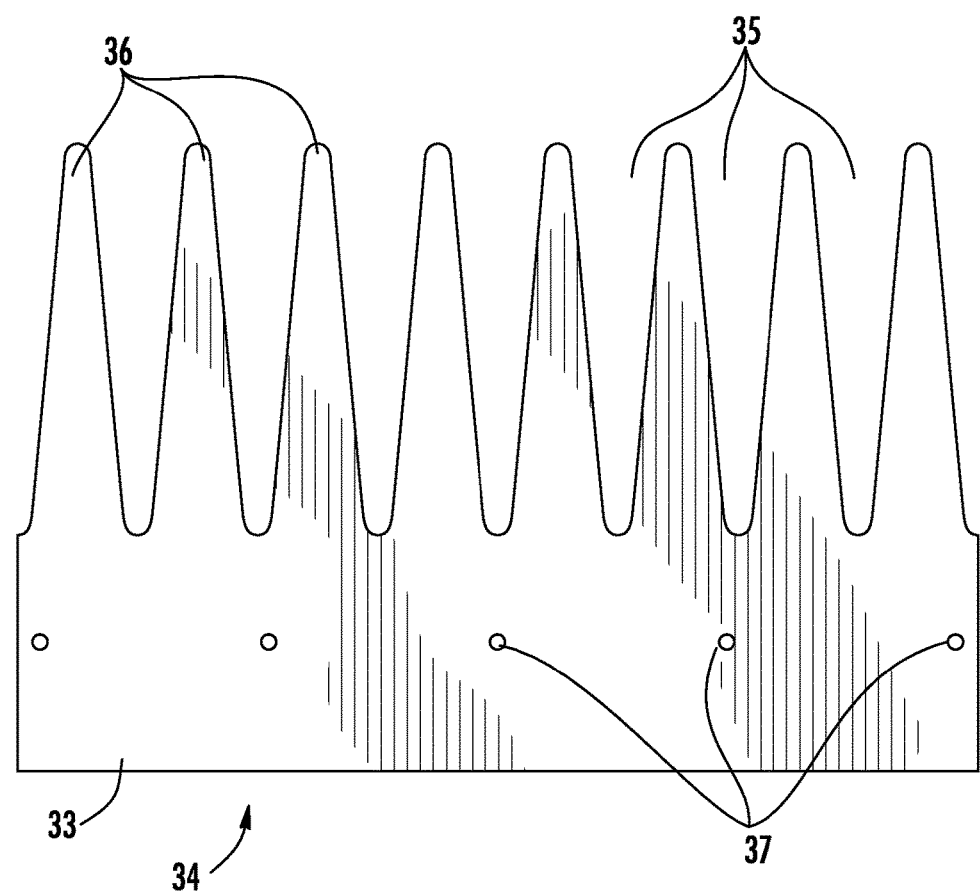
FIG. 2 is a plan view of a typical end wall segment of an end wall plate according to the invention.

FIG. 2 shows a typical end wall segment 34 of one of the pair of end wall plates 32 according to an exemplary embodiment of the invention. The end wall segment 34 is made from a relatively thin, planar sheet 33 of a bendable metal material, for example galvanized sheet metal or painted aluminum. The sheet 33 of the end wall segment 34 has cutouts 35 that define a plurality of bendable finger-shaped extensions 36 for a purpose to be described hereafter. Sheet 33 of end wall segment 34 further has a plurality of holes 37 formed there through for receiving a corresponding plurality of fasteners (not shown) to affix the end wall segment 34 to the outer casing 22 of the splice closure 20, as will be described.

Figure 3:
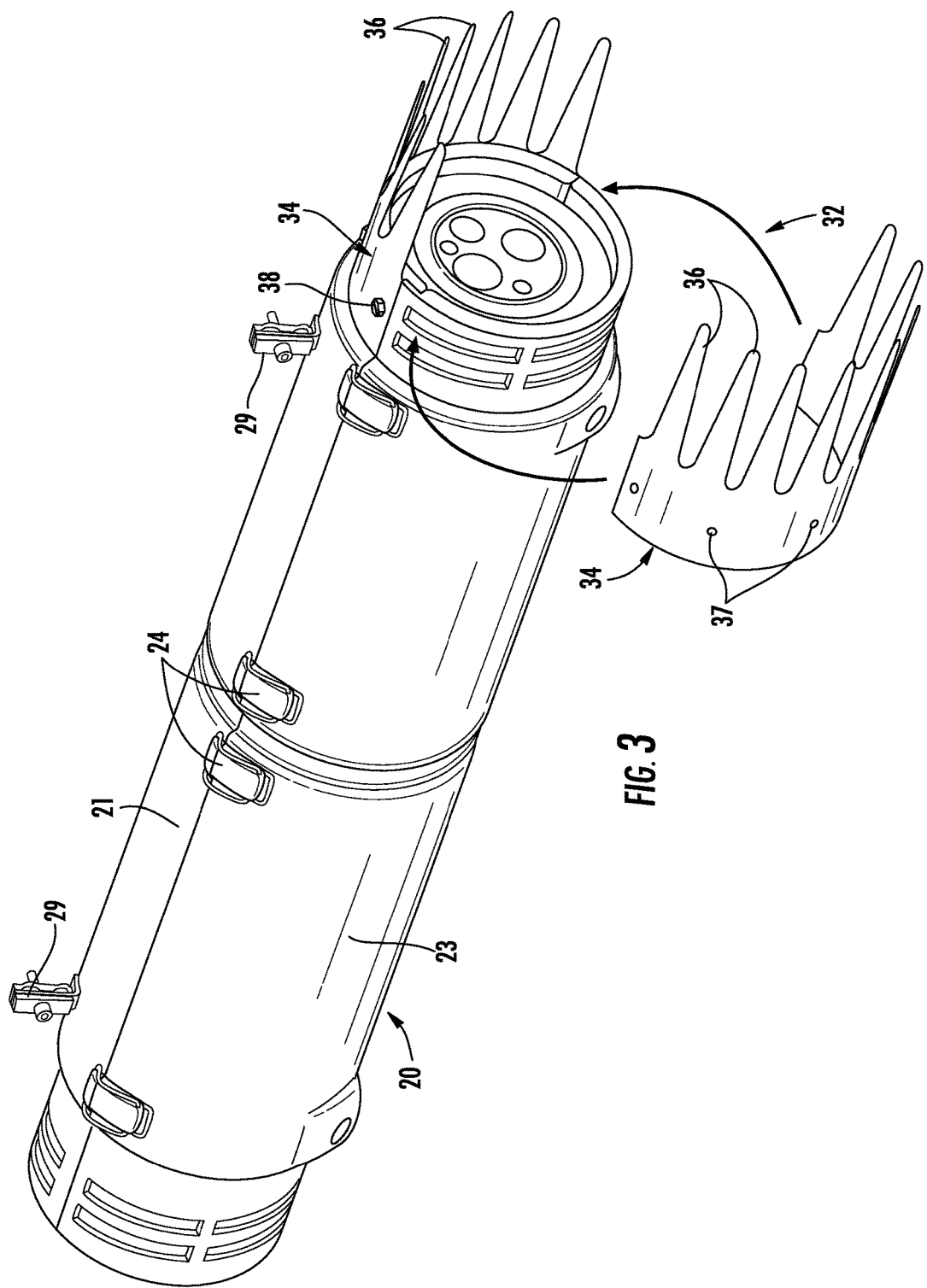
FIG. 3 is a perspective view of the aerial splice closure of FIG. 1 showing an end wall plate according to the invention with one end wall segment of the end wall plate affixed to the outer casing of the splice closure.

FIG. 3 shows the splice closure 20 of FIG. 1 with one of the pair of end wall plates 32 partially affixed to an end of the outer casing 22 of the splice closure. As shown, the end wall plate 32 comprises two of the end wall segments 34 shown in FIG. 2. However, depending on the circumference of the outer casing 22, the end wall plate 32 may comprise more than two end wall segments 34. Regardless, the end wall segments 34 are positioned around the periphery of the outer casing 22 of the splice closure 20 such that no end wall segment 34 overlaps the hinge line between the first housing half 21 and the second housing half 23. Likewise, no end wall segment 34 overlaps the line of intersection of the housing halves 21, 23 defined by the latches 24. In this manner, the second housing half 23 remains movable (i.e. rotatable) relative to the first housing half 21 about the hinge line so that the interior compartment of the splice closure 20 is accessible by a service technician to reconfigure and/or repair the cable splices. As shown, each of the planar end wall segments 34 is formed, for example by bending, into a non-linear arc to conform to the periphery of the outer casing 22 of the splice closure 20. The formed end wall segment 34 is then affixed to the outer casing 22 of the splice closure 20 by one or more fasteners 38 through holes 37 in a suitable manner. In an exemplary embodiment, fasteners 38 are self-threading (i.e. self-tapping) screws that penetrate and secure the end wall segment 34 to the relatively hard plastic of the outer casing 22 of the splice closure 20. As previously mentioned, each end wall segment 34 comprises a plurality of extensions 36 for a purpose to be described hereafter.

Figure 4A:
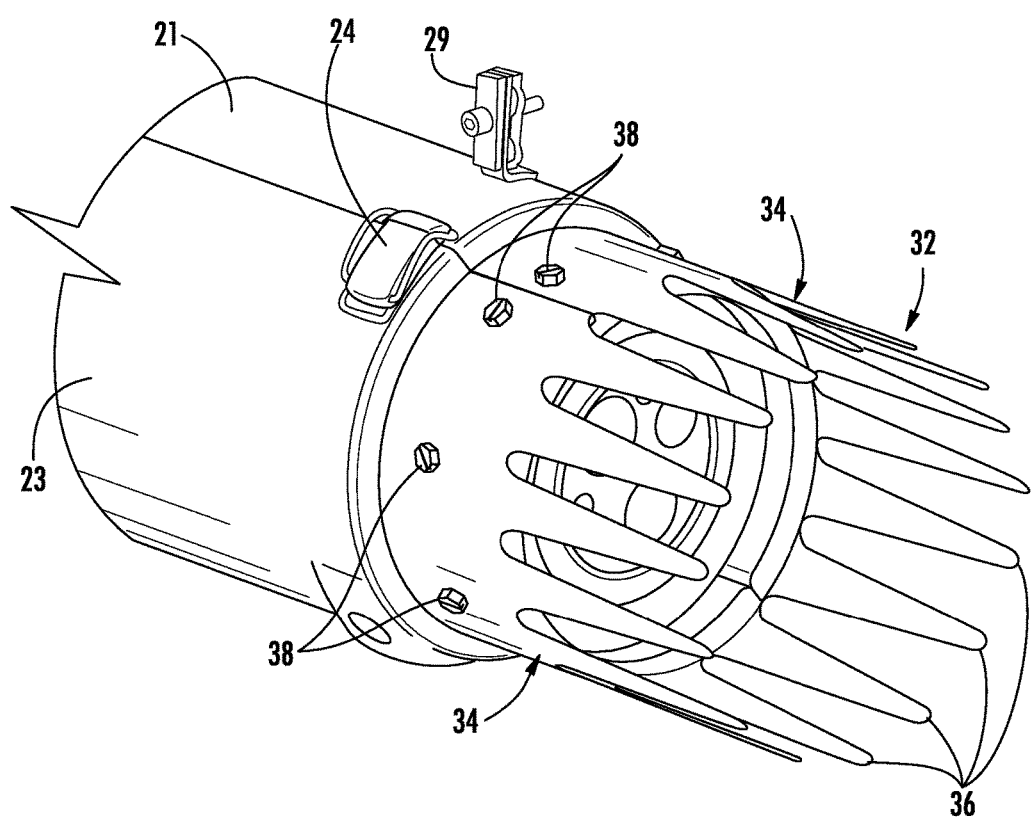
FIG. 4A is a detail perspective view showing the end wall plate of FIG. 3 with two end wall segments affixed to the outer casing of the splice closure.
Figure 4B:
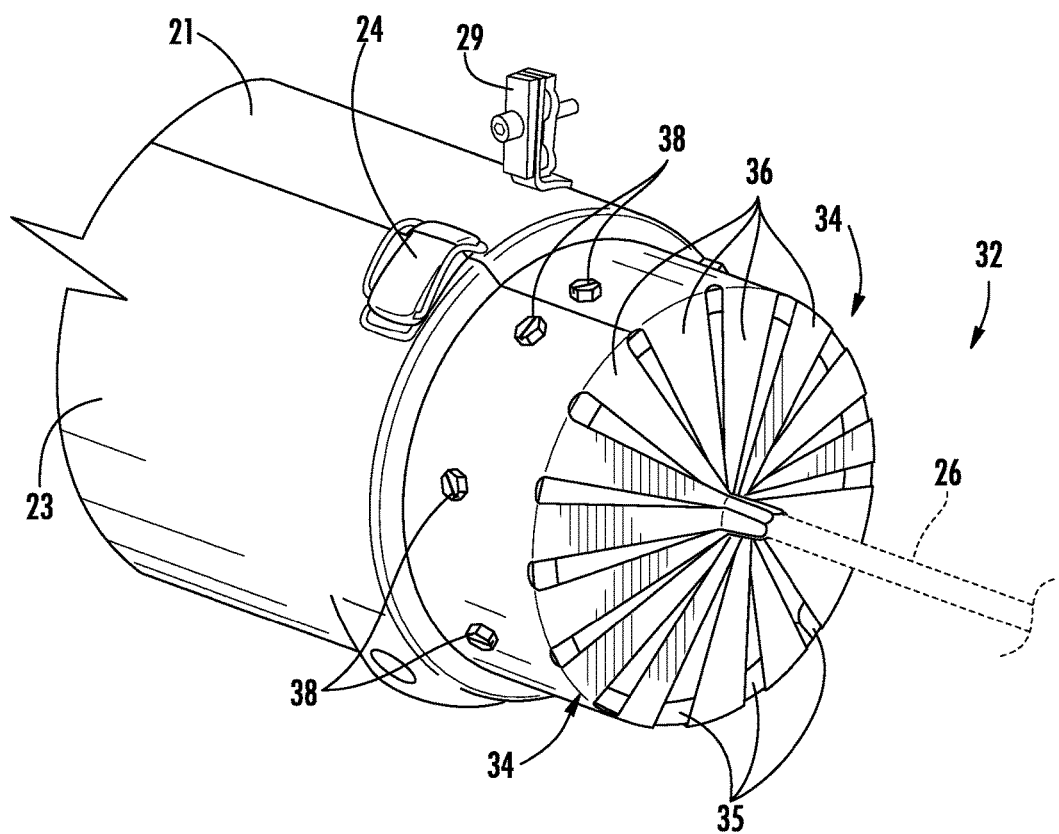
FIG. 4B is a detail perspective view showing the end wall plate of FIG. 3 with the two end wall segments of the end wall plate affixed to the outer casing of the splice closure and with the bendable finger-shaped extensions formed over one of the end walls of the splice closure and around a cable exiting the splice closure.

FIG. 4A and FIG. 4B illustrate the further installation of the two end wall segments 34 of the end wall plate 32 shown in FIG. 3 onto the outer casing 22 and the end wall 25 of the splice closure 20. More specifically, FIG. 4A shows the second end wall segment 34 of the end wall plate 32 formed into an arc to conform to the periphery of the outer casing 22 and affixed thereto by a plurality of fasteners 38 through holes 37. It should be noted that the particular number of fasteners 38 utilized to affix the end wall segments 34 to the outer casing 22 is not critical to the invention. It is only necessary that enough fasteners 38 are used to prevent a portion of an end wall segment 34 from being displaced sufficiently to expose the outer casing 22 adjacent the end wall 25 of the splice closure 20 to the teeth or claws of an animal. FIG. 4B shows the extensions 36 of the end wall segments 34 formed, for example by bending, over the end wall 25 of the splice closure 20. It should be noted that the cutouts 35 disposed between adjacent extensions 36 define a plan form area that is significantly smaller than the plan form area defined by the extensions. In this manner, exposure of the relatively soft elastomeric material of the end wall 25 to the teeth and claws of an animal is severely limited. If necessary, the distal ends of the extensions 36 may be formed, for example by bending, in the opposite direction to conform to the periphery of any cable(s) 26 entering or exiting the splice closure 20. It should also be noted that any such cable(s) 26 need not be positioned concentric to the outer casing 22 since the extensions 36 are freely formable as required to both cover the end wall 25 of the splice closure 20 and to encircle any cable(s) 26 entering or exiting the closure.

FIG. 5 shows a first housing plate 40 according to an exemplary embodiment of the invention. The first housing plate 40 is shown as a relatively thin, planar sheet 42 of bendable metal, for example galvanized sheet metal or painted aluminum. For ease of installation, however, the first housing plate 40 is pre-formed to conform to the periphery of the first housing half 21 of the outer casing 22 of the splice closure 20. More specifically, the first housing plate 40 is formed, for example by bending, into an arc that conforms to the periphery of the first housing half 21 of the outer casing 22 of the splice closure 20 on which the apparatus 30 is to be installed to prevent animal intrusion into the splice closure. As shown, the sheet 42 of the first housing plate 40 is provided with at least two through openings 43 that are configured (i.e. sized and shaped) to receive the hangers 29 that suspend the splice closure 20 from the carrier wire or cable 28. Sheet 42 further has a plurality of holes 44 formed there through for receiving a corresponding plurality of fasteners (not shown) to affix the first housing plate 40 to the outer casing 22 of the splice closure 20, as will be described.

Figure 6:
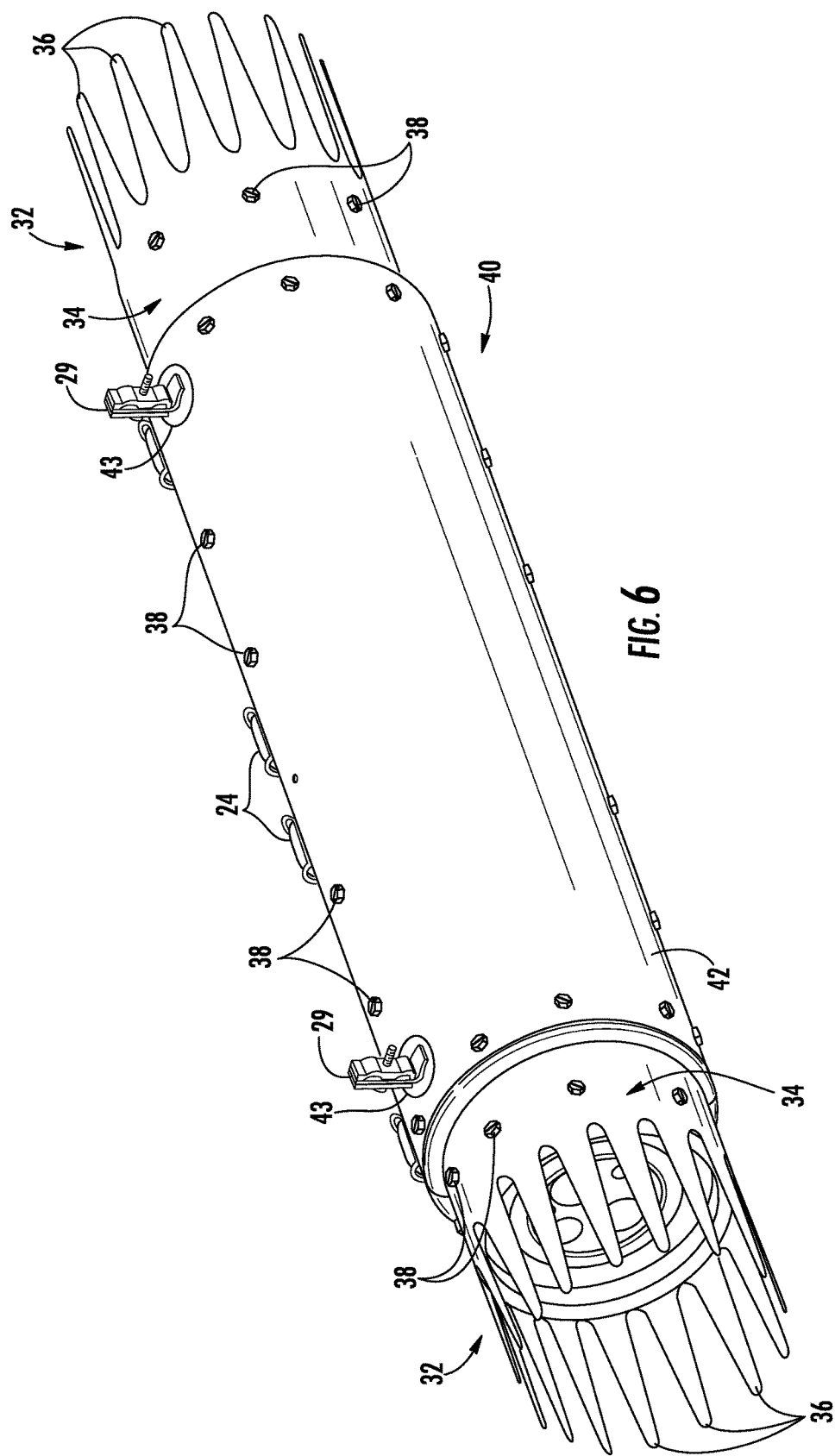
FIG. 6 is a perspective view of the splice closure of FIG. 1 showing a pair of the end wall plates of FIG. 3 and the first housing plate of FIG. 5 affixed to the splice closure.

FIG. 6 shows the splice closure 20 of FIG. 1 with the pair of end wall plates 32 partially affixed to the opposite ends of the outer casing 22 of the splice closure, and with the first housing plate 40 affixed to the first housing half 21 of the outer casing of the splice closure. As shown, the openings 43 formed in the first housing plate 40 are positioned over the hangers 29 for suspending the splice closure 20 from the carrier wire or cable 28, in the manner depicted in FIG. 1. Furthermore, the first housing plate 40 is secured to the outer casing 22 of the splice closure 20 by a plurality of fasteners 38 through holes 44, as previously described with respect to end wall segments 34, fasteners 38 and holes 37. It should be noted that the particular number of fasteners 38 utilized to affix the first housing plate 40 to the outer casing 22 is not critical to the invention. It is only necessary that enough fasteners 38 are used to prevent a portion of the first housing plate 40 from being displaced sufficiently to expose the first housing half 21 of the outer casing 22 of the splice closure 20 to the teeth or claws of an animal.

Figure 7:
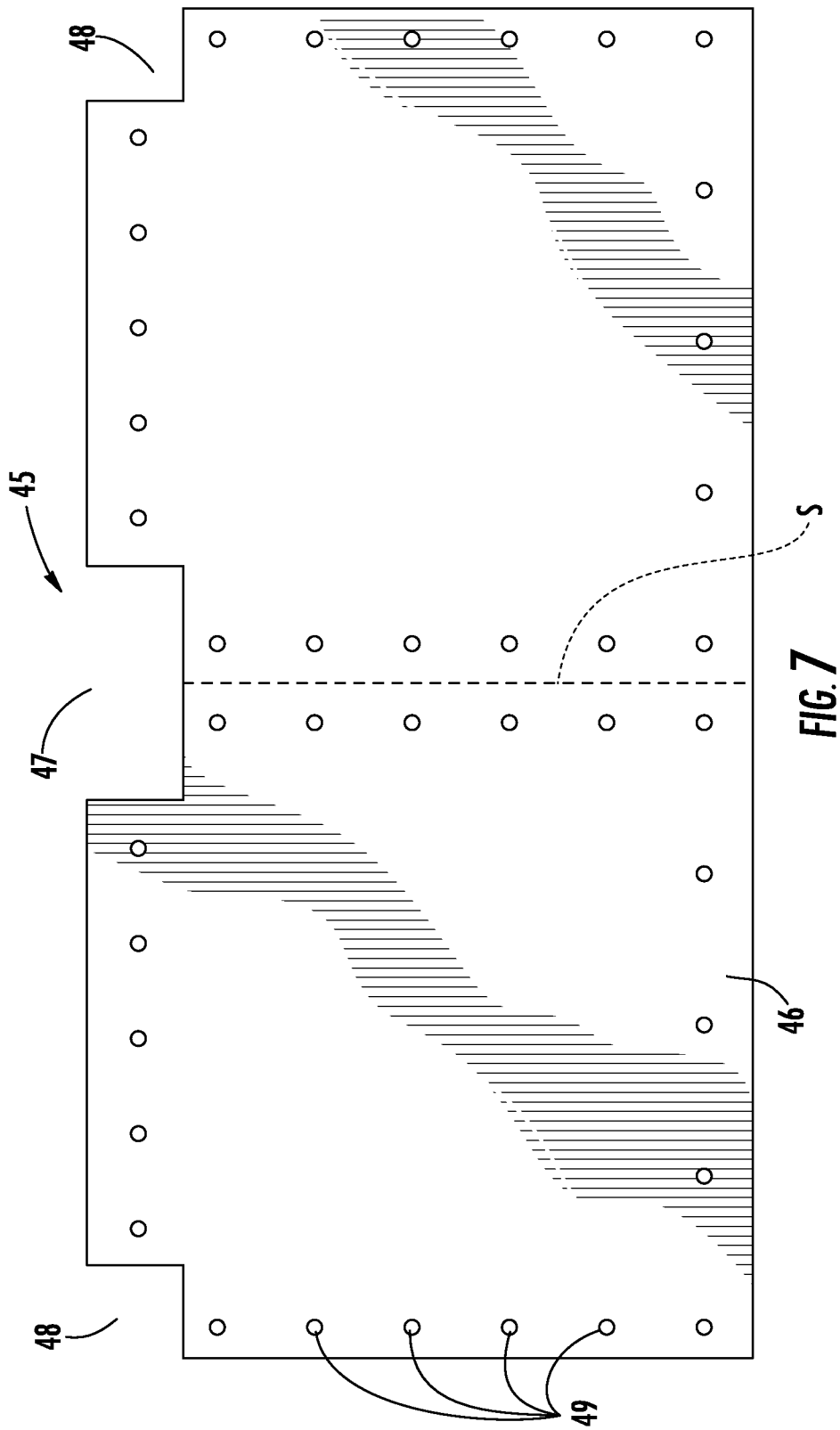
FIG. 7 is a plan view of a second housing plate according to the invention.

FIG. 7 shows a second housing plate 45 according to an exemplary embodiment of the invention. The second housing plate 45 is shown as a relatively thin, planar sheet 46 of bendable metal, for example galvanized sheet metal or painted aluminum. For ease of installation, however, the second housing plate 45 is pre-formed to conform to the periphery of the second housing half 23 of the outer casing 22 of the splice closure 20. More specifically, the second housing plate 45 is formed, for example by bending, into an arc that conforms to the periphery of the second housing half 23 of the outer casing 22 of the splice closure 20 on which the apparatus 30 is to be installed to prevent animal intrusion into the splice closure. As shown, the sheet 46 of the second housing plate 45 is provided with a medial cutout 47 along one edge. The medial cutout 47 is preferably centrally located along an edge of the sheet 46 of the second housing plate 45 for a purpose to be described. The sheet 46 of the second housing plate 45 also has a distal cutout 48 at each end of the same edge of the sheet. The distal cutouts 48 are each configured (i.e. sized and shaped) to receive a latch 24 of the splice closure 20 that secures the first and second housing halves 21, 23 together. Similarly, the medial cutout 47 is configured (i.e. sized and shaped) to receive a pair of adjacent latches 24 of the splice closure 20. Sheet 46 further has a plurality of holes 49 formed there through for receiving a corresponding plurality of fasteners (not shown) to affix the second housing plate 45 to the outer casing 22 of the splice closure 20, as will be described.

Figure 8:
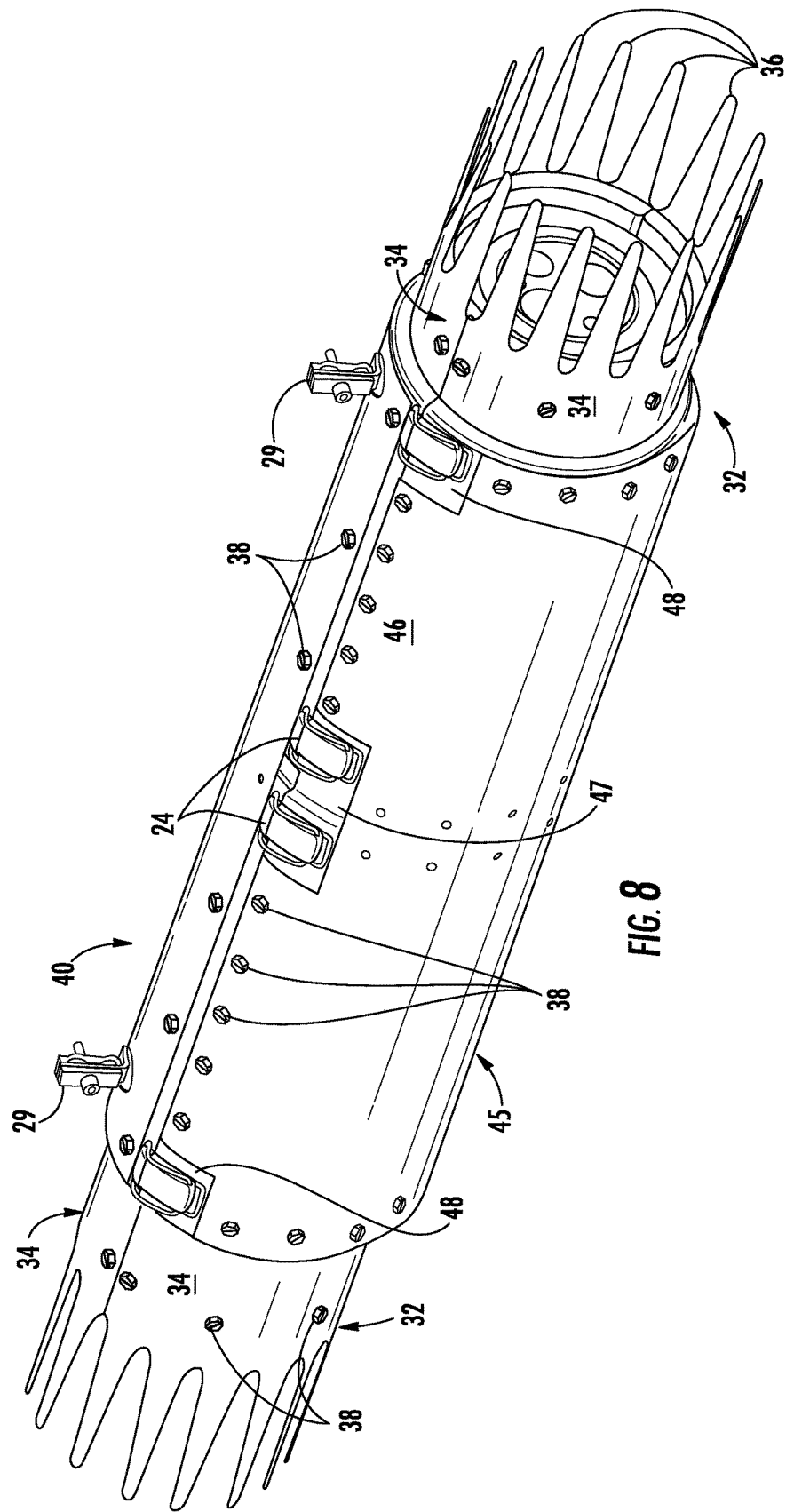
FIG. 8 is a perspective view of the splice closure of FIG. 6 showing the second housing plate of FIG. 7 affixed to the splice closure.

In an exemplary embodiment shown in FIG. 7, the second housing plate 45 is symmetric about a centerline of symmetry S. One of ordinary skill in the art, for example an aerial communications cable installation and/or repair technician, will readily understand and appreciate that it is occasionally necessary to expand the length of the splice closure 20 to accommodate additional cable splices and/or an additional length of unsheathed cable. For this purpose, certain splice closures, such as the SLiC Aerial Splice Closure commercially available from 3M Company of St. Paul, Minn., are expandable by adding a one-half length section of the splice closure to an end of the existing splice closure. In the event that the splice closure 20 is expanded in length in the aforementioned manner, the second housing plate 45 may be separated along the line of symmetry S to provide a half-length of the second housing plate to cover the expanded length of the splice closure. Likewise, the first housing plate 40 may be constructed symmetrically about a similar centerline of symmetry (not shown) for the same purpose FIG. 8 shows the splice closure 20 of FIG. 6 with the second housing plate 45 affixed to the second housing half 23 of the outer casing 22 of the splice closure. As shown, the medial cutout 47 and the distal cutouts 48 formed in the second housing plate 45 are positioned over the latches 24 for securing the first and second housing halves 21, 23 together, in the manner depicted in FIG. 1. Furthermore, the second housing plate 45 is secured to the outer casing 22 of the splice closure 20 by a plurality of fasteners 38 through holes 49, as previously described with respect to end wall segments 34, fasteners 38 and holes 37, as well as first housing plate 40, fasteners 38 and holes 44. It should be noted that the particular number of fasteners 38 utilized to affix the second housing plate 45 to the outer casing 22 is not critical to the invention. It is only necessary that enough fasteners 38 are used to prevent a portion of the second housing plate 45 from being displaced sufficiently to expose second housing half 23 of the outer casing 22 of the splice closure 20 to the teeth or claws of an animal.

Figure 9:
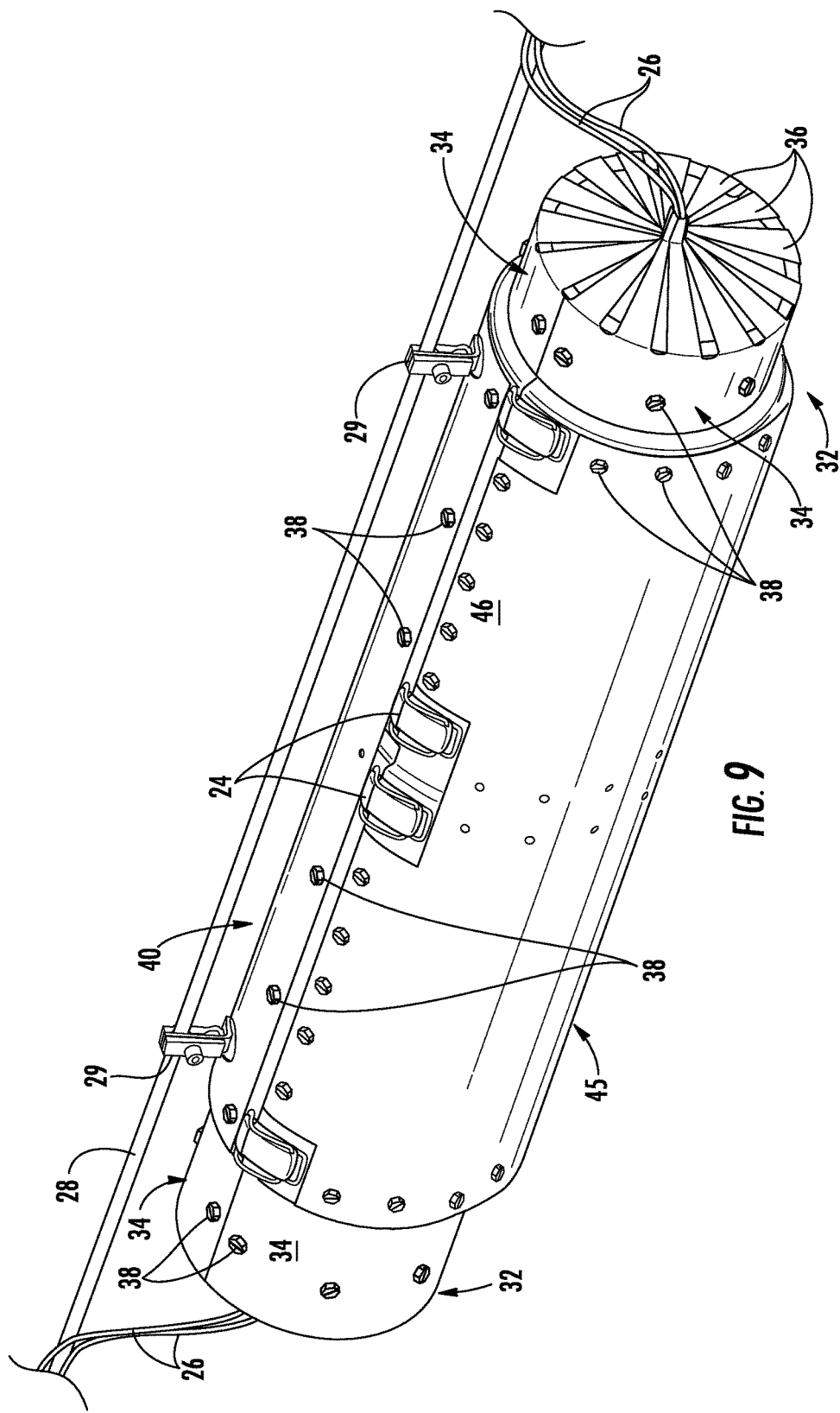
FIG. 9 is a perspective view of the splice closure of FIG. 8 showing the bendable finger-shaped extensions of a pair of the end wall plates of FIG. 3 formed over the end walls of the splice closure and around communication cables entering and exiting the splice closure.

FIG. 9 shows the splice closure 20 of FIG. 1 in a fully-armored configuration. More specifically, the splice closure 20 is fully encapsulated by the apparatus 30 of the invention consisting of a pair of end wall plates 32, a first housing plate 40 and a second housing plate 45 affixed to the outer casing 22 of the splice closure. Each of the pair of end wall plates 32 consisting of two end wall segments 34 is secured to the outer casing 22 of the splice closure adjacent an end wall 25 of the splice closure by a plurality of the fasteners 38. Furthermore, the finger-shaped extensions 36 of the end wall segments 34 are formed over the end wall 25 and around any cable(s) entering or exiting the splice closure 20, as previously described with reference to FIG. 4B. In addition, the first housing plate 40 is secured to the first housing half 21 of the outer casing 22 of the splice closure 20 by a plurality of the fasteners 38, as previously described with reference to FIG. 6. In addition, the second housing plate 45 is secured to the second housing half 23 of the outer casing 22 of the splice closure 20 by a plurality of the fasteners 38, as previously described with reference to FIG. 8. It should be noted that the apparatus 30 comprises a first housing plate 40 and a second housing plate 45 corresponding to the first and second housing halves 21, 23, respectively, of the outer casing 22 of the splice closure 20. However, depending on the circumference of the outer casing 22, the apparatus 30 may comprise more than the two housing plates 40, 45. Regardless, the first housing plate 40 and the second housing plate 45 are positioned around the periphery of the outer casing 22 of the splice closure 20 such that no housing plate 40, 45 overlaps the hinge line between the first housing half 21 and the second housing half 23. Likewise, no housing plate 40, 45 overlaps the line of intersection of the housing halves 21, 23 defined by the latches 24. In this manner, the second housing half 23 remains movable (i.e. rotatable) relative to the first housing half 21 about the hinge line so that the interior compartment of the splice closure 20 is accessible by a service technician to reconfigure and/or repair the cable splices.

A method 50 according to the invention comprises the steps necessary for encapsulating (i.e. fully armoring) an aerial splice closure 20 with an apparatus 30 according to the invention to thereby prevent animal intrusion into the splice closure. In an exemplary embodiment, method 50 comprises the step of providing a splice closure 20 having an outer casing 22 including a first housing half 21 made of a relatively hard plastic material and a second housing half 23 made of a relatively hard plastic material and movably connected to the first housing half, with an end wall 25 made of a relatively soft elastomeric material at each longitudinal end of the outer casing for closing an interior compartment defined by the outer casing. The method 50 comprises the further step of providing an apparatus 30 consisting of a pair of end wall plates 32 made of a formable metal, a first housing plate 40 made of a metal, and a second housing plate 45 made of a metal. The method 50 comprises the further step of affixing each of the end wall plates 32 to the outer casing 22 of the splice closure 20 adjacent an end wall 25 and forming at least a portion of the end wall plate over the end wall of the splice closure. The method 50 comprises the further step of affixing the first housing plate 40 to the outer casing 22 of the splice closure 20 over the first housing half 21. The method 50 comprises the further step of affixing the second housing plate 45 to the outer casing 22 of the splice closure 20 over the second housing half 23.

In another exemplary embodiment of a method 50 according to the invention, the pair of end walls 32, the first housing plate 40 and the second housing plate 45 are affixed to the outer casing 22 of the splice closure 20 by a plurality of fasteners 38. Preferably, the fasteners 38 are self-threading (i.e. self-tapping) screws that penetrate the outer casing 22 of the splice closure 20 through holes 37, 44, 49 formed through the pair of end walls 32, the first housing plate 40 and the second housing plate 45, respectively.

In yet another exemplary embodiment of a method 50 according to the invention, each of the pair of end wall plates 32 comprises one or more end wall segments 34 and each end wall segment of each end wall plate has a plurality of finger-shaped extensions 36 that are formed over the end wall 25 of the splice closure 20 by bending so as to conform to the contour of the end wall.

In yet another exemplary embodiment of a method 50 according to the invention, the first housing plate 40 is provided with one or more openings 43 each configured for receiving a corresponding hanger 29 disposed on the outer casing 22 for suspending the splice closure 20 from a carrier wire or cable 28.

In yet another exemplary embodiment, the second housing plate 45 is provided with one or more cutouts 47, 48 each configured for receiving a corresponding latch 24 disposed on the outer casing 22 for securing together the first housing half 21 and the second housing half 23 of the outer casing of the splice closure 20.

In another exemplary embodiment of a method 50 according to the invention, the first housing plate 40 and the second housing plate 45 are each configured with a centerline of symmetry S such that the first housing plate and the second housing plate are separable along the centerline of symmetry to produce a half-length housing plate that is shorter in longitudinal length for use with an expanded-length splice closure.

Regardless of the foregoing detailed description of exemplary embodiments of the invention, the optimum dimensional relationships for the individual components of the invention, including variations in size, shape, thickness, form, materials, function and manner of operation, assembly and use, as well as equivalents thereof, are deemed to be readily apparent and understood by those skilled in the art. Accordingly, equivalent relationships to those illustrated in the drawing figures and described in the written description are intended to be encompassed by the present invention, the foregoing being considered as illustrative only of the principles of the invention. Furthermore, since numerous modifications and changes will readily occur to those skilled in the art, the exemplary embodiments disclosed herein are not intended to limit the invention to the specific configuration, construction, materials and operation shown and described. Instead, all reasonably predictable and suitable equivalents and obvious modifications to the invention should be construed as falling within the scope of the invention as defined by the appended claims given their broadest reasonable interpretation in view of the accompanying written description and drawings.

That which is claimed is:

1. An apparatus for preventing intrusion into a splice closure, comprising:
   a pair of end wall plates, each end wall plate made of a generally planar sheet of a formable metal and having cutouts defining a plurality of extensions, at least the extensions being formable to conform to the contour of an end wall of the splice closure;
   a first housing plate made of a generally planar sheet of a formable metal, the first housing plate being formable to conform to the contour of a first housing half of an outer casing of the splice closure; and
   a second housing plate made of a generally planar sheet of a formable metal, the second housing plate being formable to conform to the contour of a second housing half of the outer casing of the splice closure;
   wherein the first housing plate has at least one opening configured for receiving and overlying a hanger provided on the first housing half of the outer casing to suspend the splice closure from an aerial wire or cable.

2. An apparatus according to claim 1, wherein each end wall plate comprises at least two complementary end wall segments, and wherein each end wall segment has a plurality of holes formed there through for receiving fasteners to secure the end wall segment of the end wall plate to the outer casing of the splice closure.

3. An apparatus according to claim 2, wherein each end wall segment is bendable into an arc that conforms to the contour of a portion of the outer casing of the splice closure adjacent an end wall of the splice closure.

4. An apparatus according to claim 1, wherein the first housing plate has a plurality of holes formed there through for receiving fasteners to secure the first housing plate to the outer casing of the splice closure.

5. An apparatus according to claim 1, wherein the pair of end wall plates, the first housing plate and the second housing plate are secured to the outer casing of the splice closure by a plurality of fasteners.

6. An apparatus according to claim 5, wherein the fasteners are self-threading screws.

7. An apparatus according to claim 1, wherein the plurality of extensions are formable about the end wall of the splice closure and around any cable(s) entering or exiting the splice closure through the end wall.

8. An apparatus according to claim 7, wherein each of the plurality of extensions is finger-shaped.

9. An apparatus for preventing intrusion into a splice closure, comprising:
   a pair of end wall plates, each end wall plate made of a generally planar sheet of a formable metal and having cutouts defining a plurality of extensions, at least the extensions being formable to conform to the contour of an end wall of the splice closure;
   a first housing plate made of a generally planar sheet of a formable metal, the first housing plate being formable to conform to the contour of a first housing half of an outer casing of the splice closure; and
   a second housing plate made of a generally planar sheet of a formable metal, the second housing plate being formable to conform to the contour of a second housing half of the outer casing of the splice closure;
   wherein the second housing plate has a medial cutout centrally located along an edge of the second housing plate and a distal cutout located at each end of the edge of the second housing plate, and wherein the medial cutout and the distal cutouts are configured for receiving and overlying a latch provided on the second housing half of the outer casing to secure together the first housing half and the second housing half of the splice closure.

10. An apparatus according to claim 9, wherein the second housing plate has a plurality of holes formed there through for receiving fasteners to secure the second housing plate to the outer casing of the splice closure.

11. An apparatus according to claim 9, wherein the second housing plate is symmetric about a centerline of symmetry so that the second housing plate is separable to define a half-length second housing plate configured for overlying an expanded-length portion of a splice closure.

12. A method for preventing intrusion into a splice closure, comprising:
providing a splice closure having an outer casing including a first housing half made of a relatively hard plastic material and a second housing half made of a relatively hard plastic material with an end wall made of a relatively soft elastomeric material at each longitudinal end of the outer casing;
providing an apparatus including a pair of end wall plates made of a formable metal, a first housing plate made of a metal, and a second housing plate made of a metal;
affixing each of the end wall plates to the outer casing of the splice closure adjacent an end wall and forming at least a portion of each end wall plate over the end wall of the splice closure;
affixing the first housing plate to the outer casing of the splice closure over the first housing half; and
affixing the second housing plate to the outer casing of the splice closure over the second housing half.

13. A method according to claim 12, wherein each of the pair of end walls, the first housing plate and the second housing plate are affixed to the outer casing of the splice closure by a plurality of fasteners.

14. A method according to claim 13, wherein the fasteners are self-threading screws that penetrate the outer casing of the splice closure through holes formed through each of the pair of end walls, the first housing plate and the second housing plate.

15. A method according to claim 12, wherein each of the pair of end wall plates comprises one or more end wall segments, and wherein each end wall segment of each end wall plate has a plurality of finger-shaped extensions that are formable over the end wall of the splice closure so as to conform to the contour of the end wall.

16. A method according to claim 12, wherein the first housing plate is provided with one or more openings and wherein each opening is configured for receiving a corresponding hanger disposed on the outer casing of the splice closure for suspending the splice closure from a carrier wire or cable.

17. A method according to claim 12, wherein the second housing plate is provided with one or more cutouts and wherein each cutout is configured for receiving a corresponding latch disposed on the outer casing of the splice closure for securing together the first housing half and the second housing half of the outer casing.

18. A method according to claim 12, wherein the first housing plate and the second housing plate are each configured with a centerline of symmetry such that the first housing plate and the second housing plate are separable along the centerline of symmetry to produce a half-length housing plate for use with an expanded-length splice closure.

* * * * *